United States Patent
Kochi et al.

(10) Patent No.: US 9,305,400 B2
(45) Date of Patent: Apr. 5, 2016

(54) METHOD AND SYSTEM FOR AUGMENTED REALITY

(71) Applicant: Sony Computer Entertainment Europe Limited, London (GB)

(72) Inventors: Masami Kochi, London (GB); Russell Harding, London (GB); Diarmid Archibald Campbell, London (GB); David Ranyard, London (GB); Ian Michael Hocking, London (GB)

(73) Assignee: Sony Computer Entertainment Europe Limited (GB)

( * ) Notice: Subject to any disclaimer, the term of this patent is extended or adjusted under 35 U.S.C. 154(b) by 220 days.

(21) Appl. No.: 13/888,643

(22) Filed: May 7, 2013

(65) Prior Publication Data
US 2013/0300767 A1 Nov. 14, 2013

(30) Foreign Application Priority Data

May 11, 2012 (GB) .................................. 1208265.7

(51) Int. Cl.
*G09G 5/02* (2006.01)
*G06T 19/00* (2011.01)
*G06K 9/00* (2006.01)

(52) U.S. Cl.
CPC .......... *G06T 19/006* (2013.01); *G06K 9/00671* (2013.01)

(58) Field of Classification Search
CPC .................................................... G06T 19/006
USPC .......................................................... 345/633
See application file for complete search history.

(56) References Cited

U.S. PATENT DOCUMENTS

| | | | | |
|---|---|---|---|---|
| 5,764,283 | A * | 6/1998 | Pingali et al. | 348/169 |
| 6,571,024 | B1 * | 5/2003 | Sawhney et al. | 382/294 |
| 8,606,645 | B1 * | 12/2013 | Applefeld | 705/26.1 |
| 2002/0097247 | A1 * | 7/2002 | Ohba | 345/501 |
| 2006/0035710 | A1 * | 2/2006 | Festejo et al. | 463/36 |
| 2006/0158524 | A1 * | 7/2006 | Yang et al. | 348/208.6 |
| 2008/0296390 | A1 * | 12/2008 | Dudek | 235/469 |
| 2009/0268040 | A1 * | 10/2009 | Campbell et al. | 348/207.1 |
| 2011/0115816 | A1 * | 5/2011 | Brackney | 345/629 |
| 2011/0153341 | A1 * | 6/2011 | Diaz-Cortes | 705/2 |
| 2011/0216002 | A1 * | 9/2011 | Weising et al. | 345/158 |
| 2011/0242134 | A1 * | 10/2011 | Miller et al. | 345/633 |

(Continued)

OTHER PUBLICATIONS

"Color Harmonization for Videos" Sawant, N. ; Mitra, N. Computer Vision, Graphics & Image Processing, 2008. ICVGIP '08. Sixth Indian Conference, Publication Year: 2008.*

(Continued)

*Primary Examiner* — Javid A Amini
(74) *Attorney, Agent, or Firm* — Lerner, David, Littenberg, Krumholz & Mentlik, LLP

(57) ABSTRACT

A method of augmented reality includes associating tint information with a predetermined graphical object, and receiving a video image of a real scene comprising a feature for detection. The method further includes detecting the feature in the video image of the real scene and selecting a graphical object responsive to the detected feature, and augmenting the video image with the selected graphical object. If the selected graphical object is the predetermined graphical object, the method further includes retrieving the tint information associated with the predetermined graphical object, and modifying the color balance of the video image responsive to the tint information.

15 Claims, 7 Drawing Sheets

(56) References Cited

U.S. PATENT DOCUMENTS

| | | | | |
|---|---|---|---|---|
| 2012/0275755 | A1* | 11/2012 | Southworth | 386/200 |
| 2013/0026220 | A1* | 1/2013 | Whelihan | 235/375 |
| 2013/0201185 | A1* | 8/2013 | Kochi | 345/419 |
| 2013/0215132 | A1* | 8/2013 | Fong | 345/582 |
| 2013/0282345 | A1* | 10/2013 | McCulloch et al. | 703/6 |
| 2013/0297407 | A1* | 11/2013 | Hymel | 705/14.43 |
| 2013/0303285 | A1* | 11/2013 | Kochi et al. | 463/32 |
| 2014/0058219 | A1* | 2/2014 | Kiraly | 600/301 |
| 2014/0068526 | A1* | 3/2014 | Figelman et al. | 715/863 |

OTHER PUBLICATIONS

"Improved Topological Fiducial Tracking in the reacTIVision System" Bencina, R.; Kaltenbrunner, Martin; Jorda, S. Computer Vision and Pattern Recognition—Workshops, 2005. CVPR Workshops. IEEE Computer Society Conference on DOI: 10.1109/CVPR.2005. 475 Publication Year: 2005.*

"The MagicBook—moving seamlessly between reality and virtuality", 2001 IEEE, Billinghurst, M. Kato, H.; Poupyrev, I.*

British Combined Search Report and Examination Report for Application No. GB1208265.7 dated Sep. 12, 2012.

Lukas et al., "Color Harmonization for Augmented Reality", Graz University of Technology, Aug. 24, 2010, <http://www.icg.tugraz.ac.at/Members/denis/publication/colorharmonizationforaugmentedreality>.

* cited by examiner

METHOD AND SYSTEM FOR AUGMENTED REALITY

CROSS REFERENCE TO RELATED APPLICATIONS

The present application claims the benefit of and priority to GB Application No. 1208265.7, filed May 11, 2012, the entire disclosure of which is incorporated by reference herein.

BACKGROUND OF THE INVENTION

1. Field of the Invention

The present invention relates to a method and system for augmented reality.

2. Description of the Prior Art

Augmented reality systems are known that use a video camera coupled to a computer to capture a video image, detect features of that captured video image, and then in response to the detected features, generate a graphical overlay to superpose on the captured video image which in some fashion augments the captured video image.

Referring to FIG. 1, in a typical augmented reality application a so-called fiduciary marker 800 of a known size is included in the scene to be captured by the video camera, in order to provide an easily detectable feature.

Fiduciary markers are typically high-contrast (e.g. black and white) and asymmetric patterns, so providing scope for pattern recognition in even relatively poor image capture conditions (e.g. with low resolution image capture, poor lighting, and the like). Such recognition typically provides an estimation of the position (x and y axis position) and rotation (by virtue of the marker's asymmetry) of the fiduciary marker within the captured video image.

Optionally in addition the distance of the fiduciary marker (its z-axis position) from the video camera may be estimated by comparing the size of the fiduciary marker in the captured image with a known size of the fiduciary marker (e.g. its size in pixels at a distance of 1 meter). Similarly, optionally a tilt of the fiduciary marker (i.e. its deviation from the x-y plane in the z direction) may be estimated by comparing the aspect ratio of the fiduciary marker in the captured image with the known aspect ratio of the fiduciary marker, and/or using other techniques such as detecting foreshortening (where a rectangular shape appears trapezoidal) or other distortions of the fiduciary marker in the captured video image.

The generated graphical overlay typically comprises a virtual graphics element that can then be superposed over the fiduciary marker, with the estimated position, rotation distance and tilt of the fiduciary marker used to modify the virtual graphics element as applicable.

The augmented image is then output to a display.

The subjective effect of this process is that the output video image comprises a graphical element (for example a monster or a castle) in place of the fiduciary marker, typically replicating the estimated position, rotation, distance and tilt of the fiduciary marker.

Alternatively, the fiduciary marker can be used in other ways. For example a graphical object can be positioned relative to the fiduciary marker but not covering it, or the fiduciary marker can be used to identify to an entertainment system or other computer a selected object or region of a scene; for example, placing a fiduciary marker on a table may cause an entertainment system to identify the table (for example by identifying a contiguous region of colour within a tolerance of the colour found near the fiduciary marker), after which the fiduciary marker can be removed.

In this manner, the graphical object can appear to be integrated into (or augment) the real world as captured by the video camera, enabling naturalistic interactions with the graphical object through appropriate analysis of the video and/or additional inputs from the user.

However, it will be appreciated that the subjective effect of the integration is subject to how convincingly the graphical object appears to belong within the video image.

The present invention seeks to mitigate or alleviate this problem.

SUMMARY OF THE INVENTION

In a first aspect, a method of augmented reality is provided in accordance with claim 1.

In another aspect, an entertainment device is provided in accordance with claim 11.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A method and system for augmented reality are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
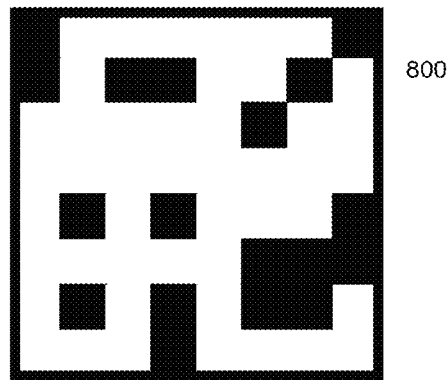
FIG. 1 is a schematic diagram of a fiduciary marker.
Figure 2A:
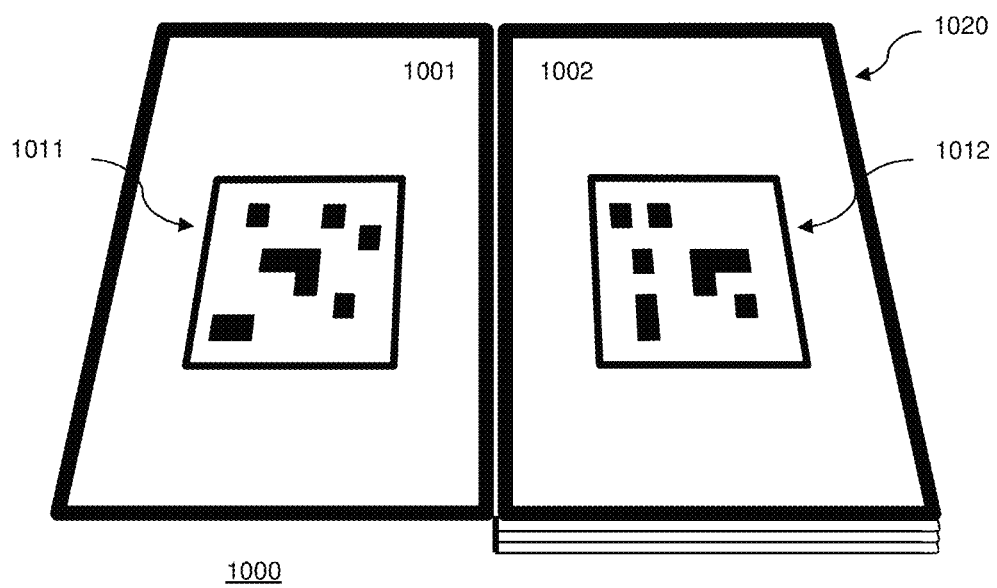
FIG. 2A is a schematic diagram of a book in accordance with an embodiment of the present invention.
Figure 2B:
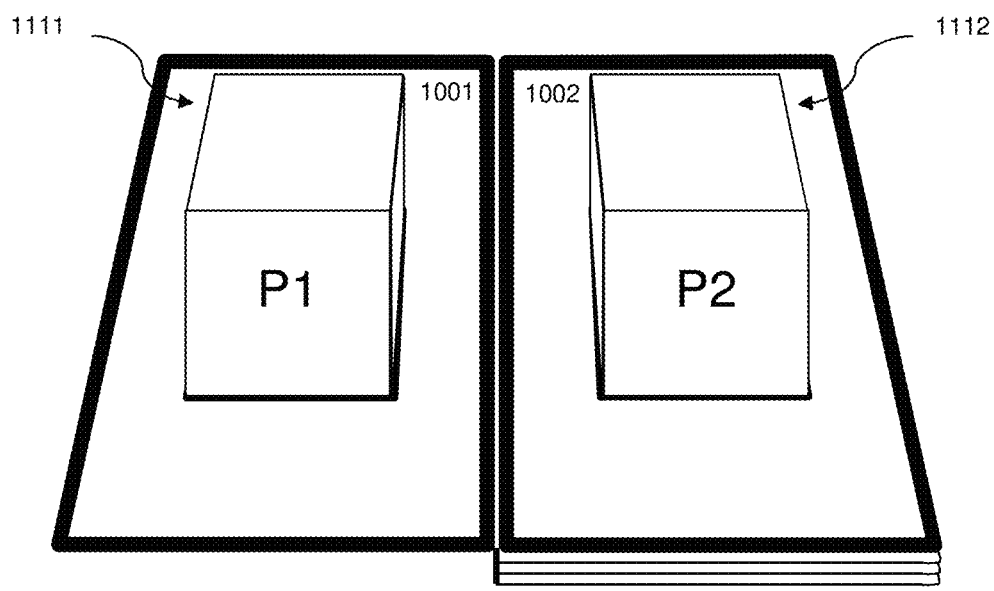
FIG. 2B is a schematic diagram of an augmented image of a book in accordance with an embodiment of the present invention.

Referring now to FIGS. 2A and 2B, in an embodiment of the present invention a book 1000 has a plurality of rigid, turnable leaves (a so-called 'board book'), and comprises fiduciary markers 1011, 1012 on each page 1001, 1002, as shown in FIG. 2A. A leaf will be understood to be a single turnable sheet or panel of a book and typically comprises a page on each side. FIGS. 2A and 2B show, by way of example, pages 1 and 2 (respectively labelled 1001 and 1002). Optionally the inside front and/or back covers of the book may also act as pages and comprise fiduciary markings. Hence in this example, page 1 may in fact be the inside front cover. Similarly, optionally the outside front and/or back covers may comprise fiduciary markings. In addition, optionally each page is edged with a high contrast marking 1020 at the outside edges to facilitate detection of the extent of the page.

An entertainment device coupled to a video camera can capture an image of the book and use known techniques to detect the fiduciary markings on each visible page, together with their position, scale, orientation and the like, as noted previously. From these, the specific page and its apparent position, scale orientation and so forth can be similarly estimated.

Given this information, then as illustrated in FIG. 2B an entertainment device can augment the captured video image of the book with virtual graphic elements 1111, 1112 corresponding to the placement, scale and orientation of the fiduciary markings 1011, 1012 on the visible pages.

The augmentation process typically comprises building a 3D model of the virtual graphic elements that have been oriented and positioned in a virtual space responsive to the orientation and position of the fiduciary markings, and projecting a view of that 3D model on to a 2D image plane consistent with the image plane of the camera. This projection forms a digital image that can then be superposed over the video image from the camera as a so-called 'augmentation layer' in order to create an augmented video image that can be output for display.

In this way the displayed version of the book becomes a 'magic' pop-up book in which the pages can come to life, under the control of the entertainment device.

Figure 3:
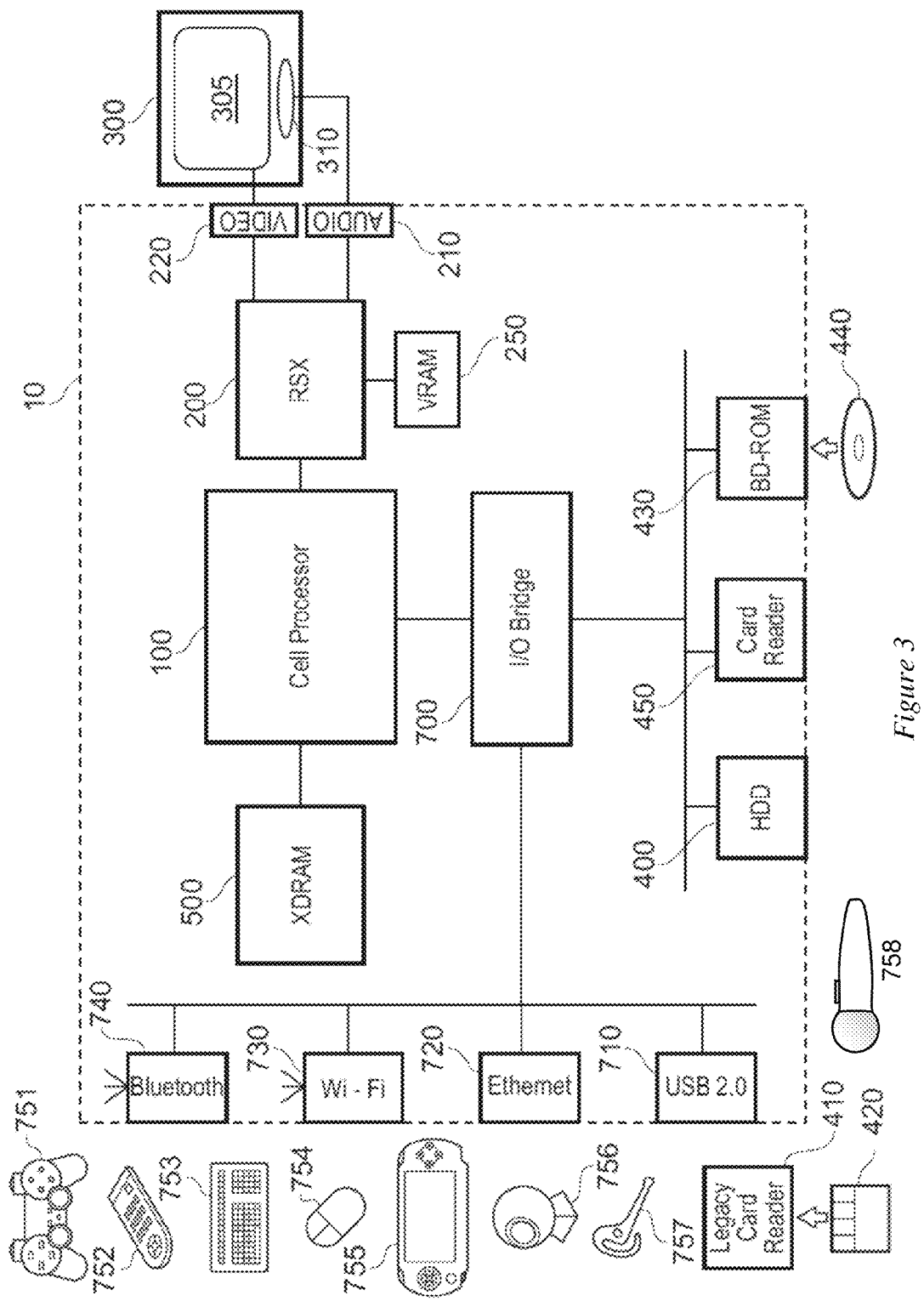
FIG. 3 is a schematic diagram of an entertainment device in accordance with an embodiment of the present invention.

FIG. 3 schematically illustrates a suitable entertainment device for implementing the method, known as the Sony® Playstation 3® entertainment device or PS3®. The PS3 comprises a system unit 10, to which various peripheral devices are connectable including a video camera, as detailed below.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

In particular, these connections enable a video camera such as an EyeToy® video camera 756 (or a stereoscopic video camera, not shown) to be coupled to the PS3 in order to capture a video image (or stereoscopic video image pair) of the book.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the Playstation Move® 758 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In embodiments of the video camera, it is stereoscopic. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled person will be aware that a device driver or similar software interface may be required in the present embodiment described.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4A:
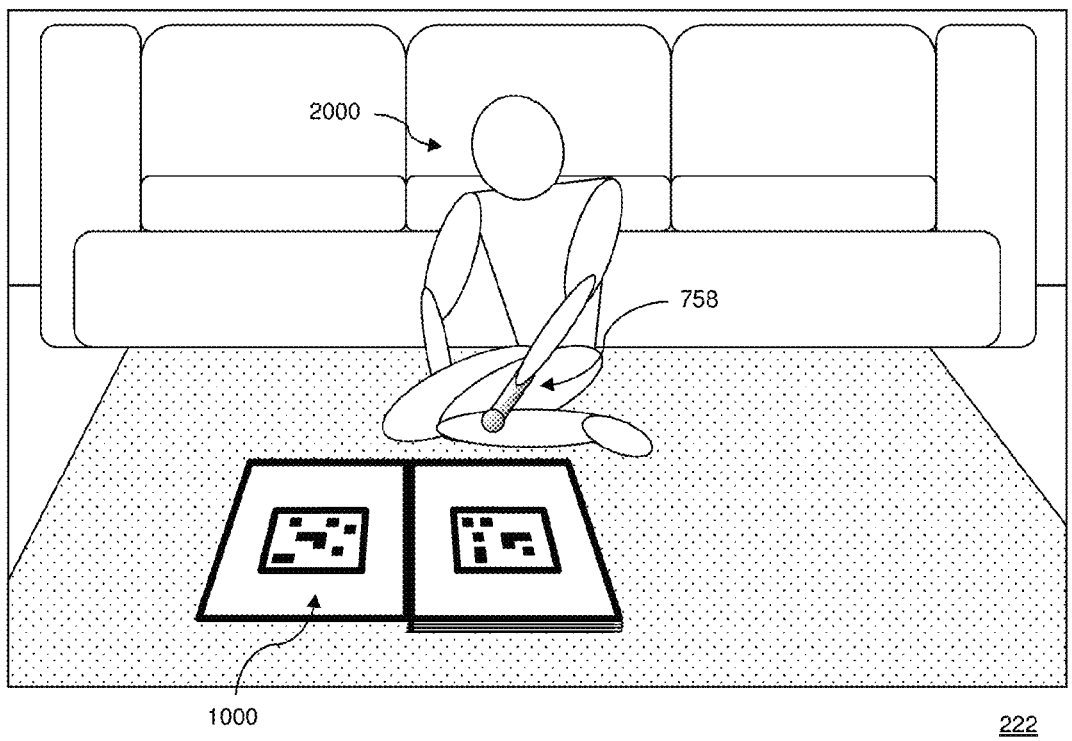
FIG. 4A is a schematic diagram of an input video image comprising a book, in accordance with an embodiment of the present invention.

Turning now to FIG. 4A, this illustrates a typical real scene that might be captured by the video camera 756, and hence represents a typical input video image that may be received by the PS3. In the image, a user 2000 is interacting with the book 1000, in this case in conjunction with a PlayStation® Move® controller 758. Background features, such as carpets/flooring, sofas, wallpaper and the like may also be present in the video image.

Figure 4B:
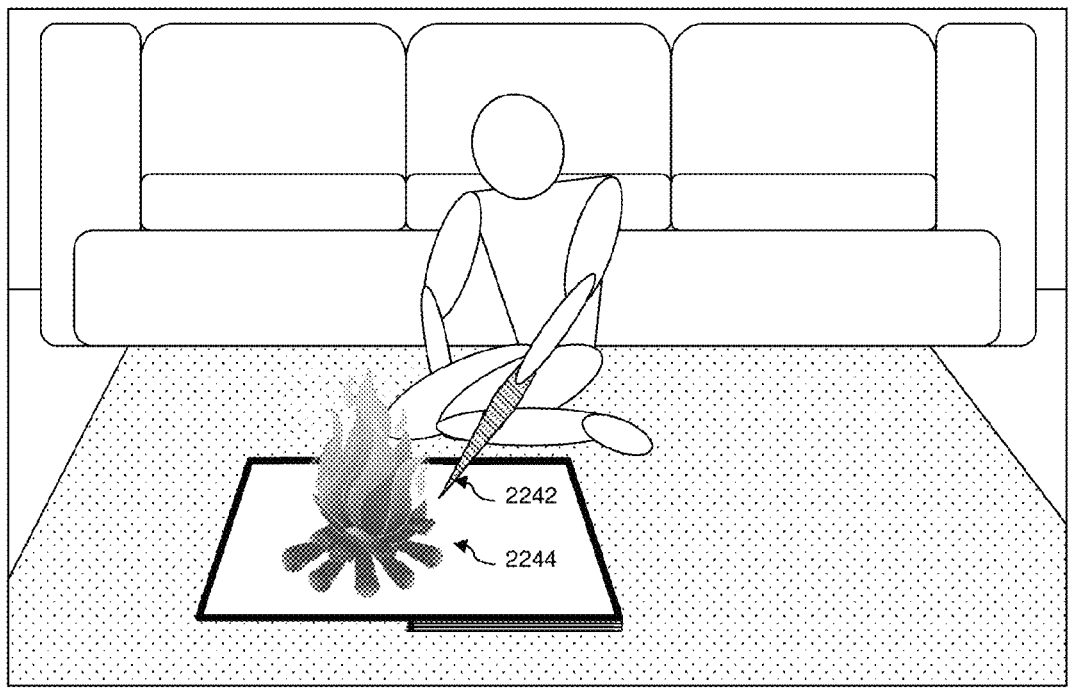
FIG. 4B is a schematic diagram of an augmented input video image comprising a book, in accordance with an embodiment of the present invention.

Turning now also to FIG. 4B, this illustrates a typical augmentation of the captured video image. In this case, the PlayStation® Move® has been augmented with the image of a wand 2242, based upon the detected position of the device's light in the video image, and orientation data transmitted from the device itself to the PS3 (for example based upon its accelerometer signals).

Meanwhile, in response to the displayed fiduciary markings the book has been augmented as a campsite with a campfire 2244, and the user has just pointed the wand at the campfire to ignite it.

In this way, as described previously, the displayed version of the book becomes a 'magical' pop-up book with which the user can interact.

It will be appreciated that in response to the detected fiduciary marker(s), different objects and graphical effects can be generated for each page of such a book, or further in response to specific interactions with one or more such pages or objects; and that it is desirable for these objects and effects to integrate as realistically as possible with the captured video image.

In particular, some predetermined graphical objects may be commonly expected to be light sources, such as the campfire of FIG. 4B. Notably however, the light source will not appear to interact with the video image if it is simply superposed upon the video image.

The process of generating the augmentation layer may therefore be modified to calculate how the light source projects into the virtual camera plane, in order to generate a second augmentation layer of lighting effects. This layer may be superposed over the first augmentation layer, in turn superposed on the original video image, with a suitable alpha (transparency) value, to make the light source appear to affect the whole of the augmented output image.

Alternatively the graphical object may have two parts, one being a solid (non-transparent) component and one being a partially transparent component defining a lighting effect, so that the generation of the augmented image adds a partially transparent effect over the original video.

However, these techniques are generally computationally costly.

Consequently, in an embodiment of the present invention, such predetermined graphical objects are associated with tint information. Tint information may take the form of red, green and blue values (or values for any colour space used by the video image) that specify a change in the colour balance of the video image.

Hence for example the campfire may have associated with it the tint information: Red (+20), Green (−10), Blue (−20). In this case, the values may represent absolute values (for example out of 256 in an 8 bit colour channel space) or more generally a percentage with respect to the full colour range in each channel. The sign indicates whether the value should be added or subtracted from a current colour value, and may be represented by any suitable sign convention.

The Cell processor and/or RSX graphics processor then apply the respective value change to each colour channel of each pixel in the input video image to generate a tinted video image for use instead of the original video image. Where the applied change results in a pixel colour value exceeding the upper or lower permitted value for the relevant colour channel, then the result can be clipped to the limit value.

Hence in an embodiment of the present invention, the tint is applied consistently as an absolute value shift in the RGB colour channels to the extent specified by the tint information, for all affected pixels. As noted later herein, the affected pixels can be all those in the image or a subset (typically defined by distance from the predetermined graphical object). The shift itself can also be scaled by distance.

Advantageously, such an addition/subtraction is very simple and efficient to perform, enabling the video image to be tinted with little computational cost.

The result for the above example is that the tinted video image will have a red/orange tint compared to the original video image.

A modified technique for applying the tint is change the colour of a pixel as a function of both the tint values and the current pixel colour values. Hence for example an absolute or percentage tint value of 10 may be calibrated to the centre value in the colour range; that is to say, for a pixel with a value of 128 in one of its colour channels, a value of +10 will change the value to 138 (note that 128 is assumed here to be the middle value in a colour channel with 256 discrete values for illustrative purposes only).

However, for a dark part of the image, a pixel with a similar colour balance may have an equivalent value of 13 in the same colour channel. Clearly, shifting this value to 13+10=23 has a disproportionate effect on the brightness of the pixel. In some circumstances this may be desired (e.g. where the graphical object is a light source, this may be appropriate), but in other cases it is better to scale the tint value appropriately. Hence if 128/13 is approximately 10, then dividing the tint value by 10 results in a scaled tint value of 1. Applying this to the pixel colour channel results in a new value of 14.

Hence in an embodiment of the present invention, the tint value is scaled proportional to the relative brightness of the current pixel's respective colour value, for example with reference either to a mid-point value (such as 128) of a full-range value (such as 256).

Thus, where the tint value is simply added, effectively it adds light of a certain colour uniformly, whereas where the tint value is scaled to current pixel brightness, it effectively adds the tint without changing the brightness by a disproportionate amount.

In either case, this tinted video image may then be augmented as described previously in a conventional manner, without the need for additional augmentation layers, light effect calculations or additional partially transparent objects.

Figure 5:
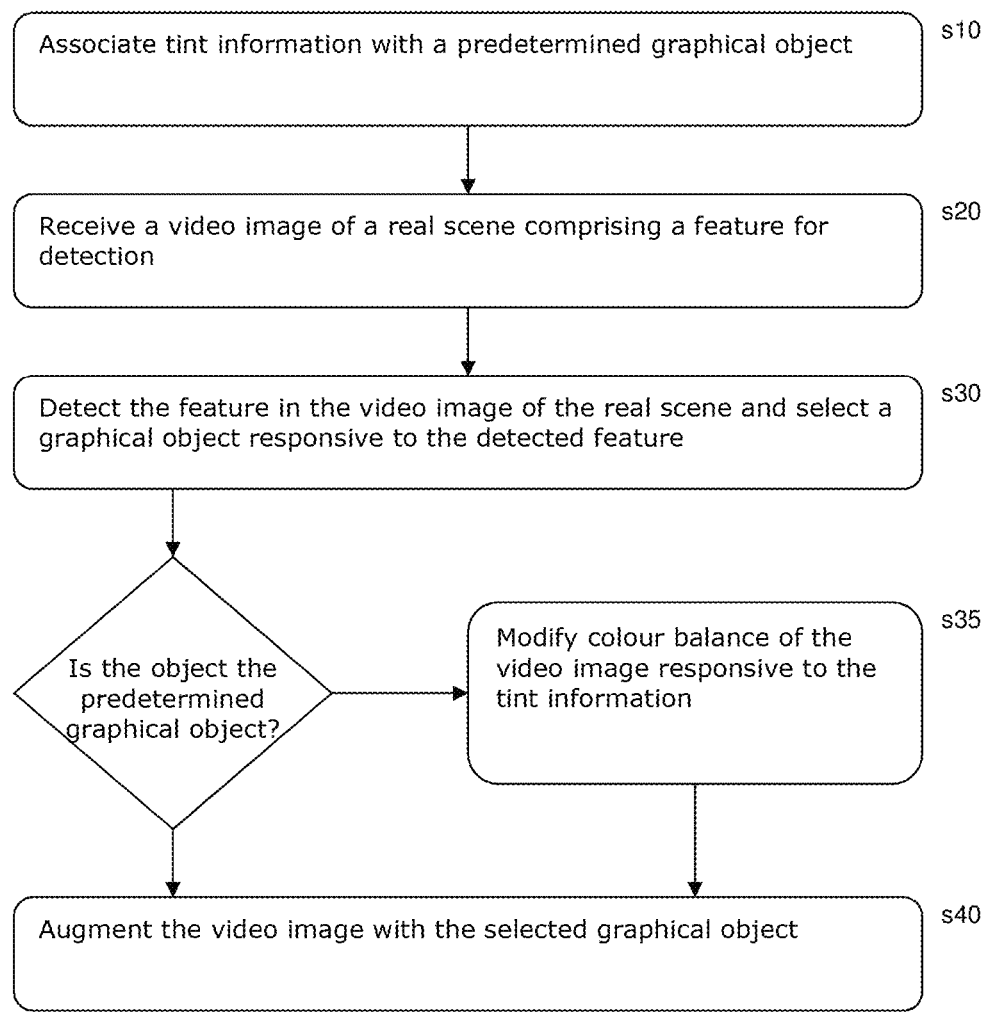
FIG. 5 is a flow diagram of a method of augmenting a video image in accordance with an embodiment of the present invention.

Hence more generally and referring to FIG. 5, a method of augmented reality may comprise:

In a first step s10, associating tint information with a predetermined graphical object (such as a light source);

In a second step s20, receiving a video image of a real scene comprising a feature for detection such as a book comprising a fiduciary marker;

In a third step s30 detecting the feature in the video image of the real scene and selecting a graphical object responsive to the detected feature (such as a campfire) and In a fourth step s40 augmenting the video image with the selected graphical object, but if the selected graphical object is the predetermined graphical object (in other words if the, or one of the, objects selected to augment that particular page of the book is a light source or would otherwise be expected to alter the colour balance of the video image in the real scene), then in a supplementary step s35, the tint information associated with the predetermined graphical object is retrieved, and the colour balance of the video image is modified responsive to the tint information to create a tinted version of the video image.

Figure 6A:
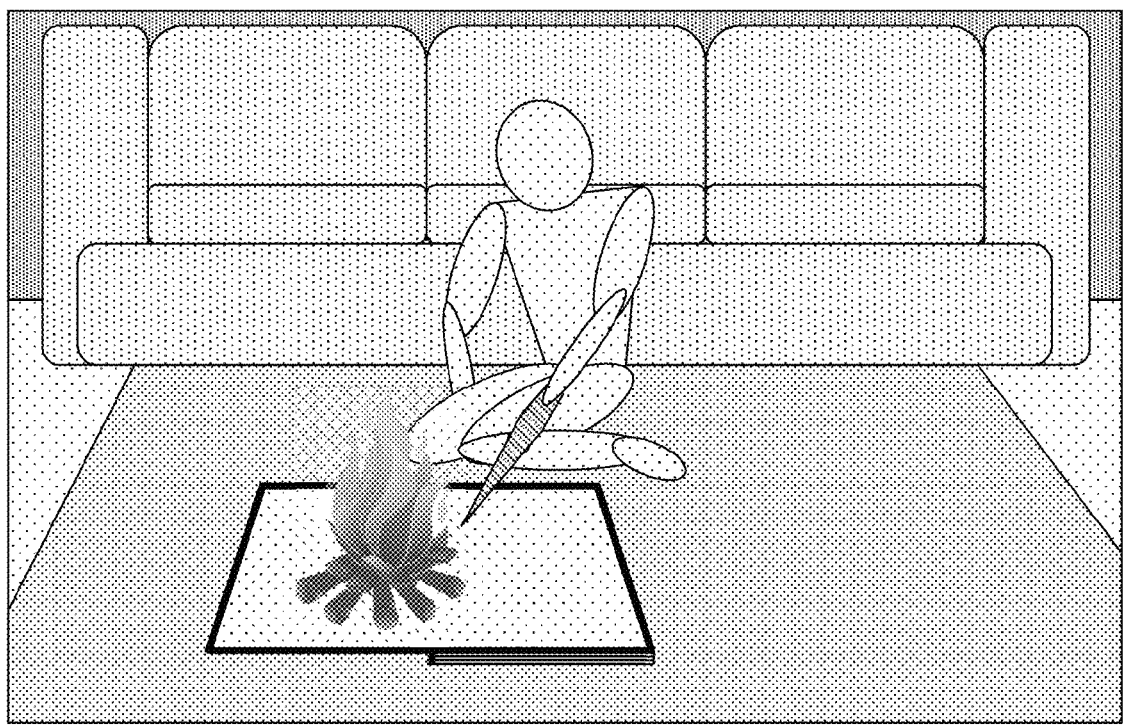
FIG. 6A is a schematic diagram of an augmented input video image comprising a book, in accordance with an embodiment of the present invention.

As shown in FIG. 6A (which shows an augmented video image 226), and as described above, the colour balance can be modified uniformly over the whole video image. In FIG. 5A, this is illustrated by different patterning in the illustrated video image when compared with FIG. 4B.

Figure 6B:
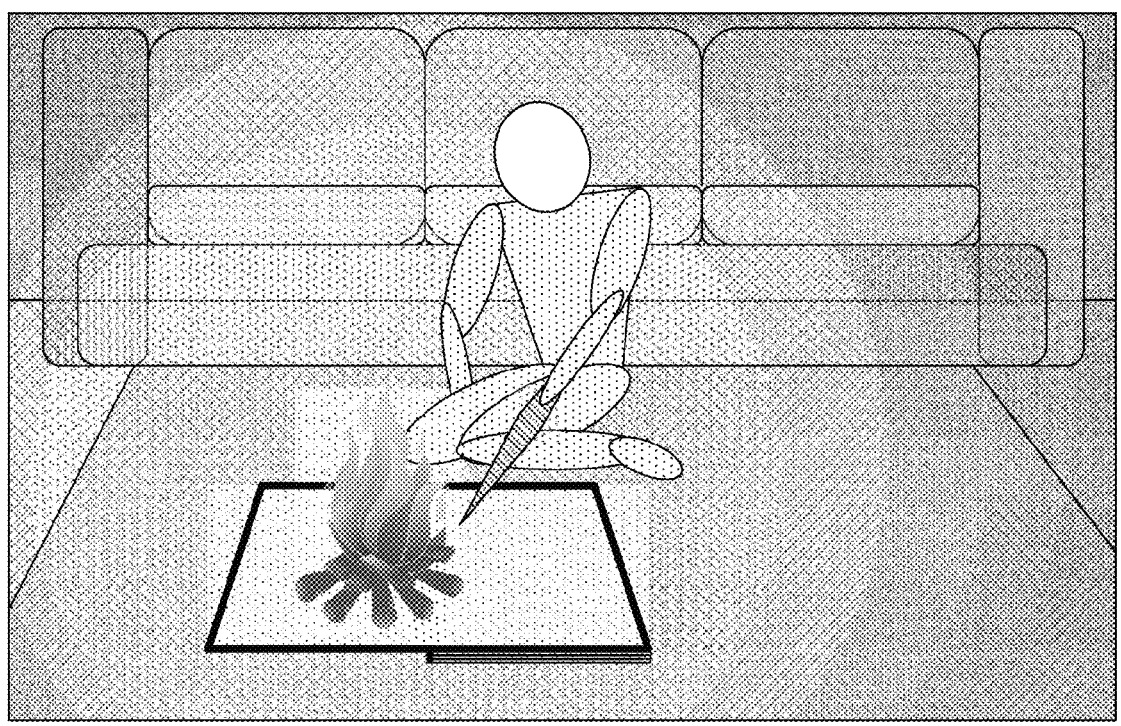
FIG. 6B is a schematic diagram of an augmented input video image comprising a book, in accordance with an embodiment of the present invention.

However, referring now to FIG. 6B (which shows an augmented video image 228), alternatively in an embodiment of the present invention, the colour balance can be modified to an extent dependent on the position of a video image pixel with respect to a position of the predetermined graphical object that it will occupy in the augmented video image (for example to a notional position on which the object is centred).

Hence for example, the dependency can be the distance of the pixel to the notional position. This is illustrated in FIG. 6B by a series of concentric patterns over the image centred on such a position, illustrating different degrees to which the tint has been applied. It will be appreciated that typically the tint will be applied in an inverse relationship to distance, such that the influence of the virtual light source appears to diminish with distance.

Hence for example, the change in tint for the red colour channel of a pixel $P_{xy}$ may be calculated as $$P_{xy}(Red_{new}) = P_{xy}(Red_{old}) + (\Delta_{Red} * Dist(P_{xy})), \quad \text{Eq. 1}$$

Where $Dist(P_{xy}) = Max(S_x - P_x, S_y - P_y) - ((P_x - O_x)^2 + (P_y - O_y)^2)^{1/2}$ or, to a first estimate, $Dist(P_{xy}) = Max(0, S_x - 1/2 ((P_x - O_x) + (P_y - O_y)))$, where $O_{xy}$ is the position occupied by the object, $S_x$, $S_y$ are the resolution (maximum pixel position values) of the image; and $\Delta Red$ is the value range of the red colour channel multiplied by the percentage in the tint information (e.g. 256*−20%=−51). Similar changes are made for the blue and green channels (or whichever colour channels are used in the system). In the above scheme, $S_x$ and/or $S_y$ thus typically determine the range of the perceptible tint, and can be substituted for a different value at the designer's discretion.

Alternatively or in addition the tint and/or the extent of the tint can be modified as a function of time, to create a flickering effect consistent with fire, for example.

Hence Equation 1 above may be modified as:

$$P_{xy}(Red)_{new} = P_{xy}(Red)_{old} + ((\Delta_{Red} * FuncA(t)) * (Dist(P_{xy}) * FuncB(t))), \quad \text{Eq. 2}$$

Where FuncA(t) and FuncB(t) are time dependent functions, for example returning a value in the range 0.9 to 1.1 as a function of time. The function may for example be a sinusoidal or pseudorandom function, or a combination of the two. FuncA(t) and FuncB(t) may be the same function or different functions. Notably $(\Delta_{Red} * FuncA(t))$ only needs to be calculated once per frame.

It will be appreciated that position data for the object in the augmentation layer will typically be calculated as part of the process of generating the augmentation layer. For example, the position of the top left pixel of the object in the augmentation layer may be known, as may the dimensions of the object. From this it is straightforward to calculate a position for the centre point of the object, for example.

Alternatively, the tint information can be supplemented with preferred position information, for example as vertical, horizontal and optionally depth percentages of the object from a reference point on the object (or a reference corner of a notional box bounding the object).

This enables realistic centring of the tint modification on a virtual object where the light source is clearly not coincident with the centre of the object, as for example with a flaming torch.

Hence in an embodiment of the present invention, position offset information is associated with the tint information, and the position of the predetermined graphical object (for the purposes of modifying tint as a function of object position) is derived with reference to the position offset information.

Similarly, in an embodiment of the present invention, brightness information can also be associated with the predetermined graphical object, and if the graphical predetermined object is selected for use in the augmentation layer, also modifying the brightness of the video image responsive to the brightness information.

Hence for example if a thundercloud is selected for use in the augmented image, in addition to applying a blue tint associated with the thundercloud being applied to the video image, the brightness of the video image may also be reduced.

As noted previously, a suitable entertainment device for implementing the above techniques is the Sony PS3. Hence in an embodiment of the present invention, an entertainment device such as the PS3 (10), for generating an augmented reality image for display, comprises a processor means (such as the Cell processor 100) operable under suitable software instruction to associate tint information with a predetermined graphical object (for example in RAM or on HDD), and an input means such as a USB port 720 operable to receive a video image of a real scene comprising a feature for detection, for example from an EyeToy or PlayStation Eye 756. The Cell processor, under suitable software instruction, is then operable to detect the feature in the video image of the real scene (such as a fiduciary marker 1011, 1012 on a book 1000), and to select a graphical object 2242 responsive to the detected feature. A graphics processing means such as the RSX 200 is then operable to augment the video image with the selected graphical object. However, if the selected graphical object is the predetermined graphical object, the processor means is operable to retrieve the tint information associated with the predetermined graphical object, and the graphics processing means is operable to modify the colour balance of the video image responsive to the tint information.

Similarly, the graphics processing means is optionally operable to modify the colour balance to an extent dependent on the position of a video image pixel with respect to the position that the predetermined graphical object will occupy in the augmented video image.

Likewise, the processor means is optionally operable to associate brightness information with the predetermined graphical object, and if the selected graphical object is the predetermined graphical object, the graphics processing means is optionally operable to modify the brightness of the video image responsive to the brightness information.

A system for generating an augmented reality image for display may thus comprise the entertainment device as described herein, a video camera operably coupled to the entertainment device. The system may then be coupled to a TV or other display in use.

The system may then operate upon an image of a book comprising one or more turnable leaves, upon the pages of which are printed a respective fiduciary marker, or alternatively or in addition may operate upon images of individual marker cards or other suitable features for detection.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or in the form of a transmission via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiment of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

We claim:

1. A method of augmented reality, comprising the steps of:
associating, by one or more processors, tint information with a predetermined graphical object, the tint information identifying colour space values specifying a change in colour balance;
receiving a video image of a real scene comprising a feature for detection;
detecting, by the one or more processors, the feature in the video image of the real scene and selecting a graphical object responsive to the detected feature; and
augmenting, by the one or more processors, the video image with the selected graphical object;
and in which
when the selected graphical object is the predetermined graphical object:
retrieving the tint information associated with the predetermined graphical object; and
modifying, by the one or more processors, a colour balance of the video image responsive to the tint information by applying the tint information as a value shift in colour channels of the colour space to an extent specified by the tint information, the value shift being either a proportional or an absolute value shift in the colour channels.

2. The method of claim 1 in which the colour balance is modified uniformly over the whole video image.

3. The method of claim 1 in which the colour balance is modified to an extent dependent on a position of a video image pixel with respect to a position of the predetermined graphical object that it will occupy in the augmented video image.

4. The method of claim 3 in which the colour balance is modified to an extent proportional to the distance of a video image pixel from a position of the predetermined graphical object that it will occupy in the augmented video image.

5. The method according to claim 3, in which position offset information is associated with the tint information, and the position of the predetermined graphical object is derived with reference to the position offset information.

6. The method according to claim 1, in which the colour balance is modified in a time variant manner.

7. The method according to claim 1, comprising the steps of:
- associating brightness information with the predetermined graphical object; and
- when the selected graphical object is the predetermined graphical object, modifying the brightness of the video image responsive to the brightness information.

8. The method according to claim 1, in which the feature for detection is a fiduciary marker.

9. The method of claim 8, in which the fiduciary marker is one of a plurality of respective fiduciary markers printed in a book.

10. A non-transitory computer-readable storage medium storing computer program instructions thereon, the computer instructions, when executed by a processor, implement a method comprising the steps of:
- receiving a video image of a real scene comprising a feature for detection;
- detecting the feature in the video image of the real scene and selecting a graphical object responsive to the detected feature; and
- augmenting the video image with the selected graphical object;
- and in which
- when the selected graphical object is the predetermined graphical object:
  - retrieving tint information associated with the predetermined graphical object, the tint information identifying colour space values specifying a change in colour balance; and
  - modifying a colour balance of the video image responsive to the tint information by applying the tint information as a value shift in colour channels of the colour space to an extent specified by the tint information, the value shift being either a proportional or an absolute value shift in the colour channels.

11. An entertainment device for generating an augmented reality image for display, comprising:
- a processor means for associating tint information with a predetermined graphical object, the tint information identifying colour space values specifying a change in colour balance;
- an input means for receiving a video image of a real scene comprising a feature for detection;
- the processor means being configured to detect the feature in the video image of the real scene, and to select a graphical object responsive to the detected feature;
- and graphics processing means for augmenting the video image with the selected graphical object;
- and in which
- when the selected graphical object is the predetermined graphical object,
  - the processor means is configured to retrieve the tint information associated with the predetermined graphical object; and
  - the graphics processing means is operable to modify a colour balance of the video image responsive to the tint information by applying the tint information as a value shift in colour channels of the colour space to an extent specified by the tint information, the value shift being either a proportional or an absolute value shift in the colour channels.

12. The entertainment device of claim 11, in which the graphics processing means is configured to modify the colour balance to an extent dependent on the position of a video image pixel with respect to the position that the predetermined graphical object will occupy in the augmented video image.

13. The entertainment device of claim 11, in which:
- the processor means is configured to associate brightness information with the predetermined graphical object; and
- when the selected graphical object is the predetermined graphical object,
- the graphics processing means is configured to modify the brightness of the video image responsive to the brightness information.

14. A system for generating an augmented reality image for display, comprising
- the entertainment device of claim 11; and
- a video camera operably coupled to the entertainment device.

15. The system of claim 14, comprising:
- a book comprising one or more turnable leaves, upon whose pages are printed respective fiduciary markers.

* * * * *